United States Patent [19]

Hettinga

[11] Patent Number: 5,422,059

[45] Date of Patent: Jun. 6, 1995

[54] METHOD FOR INJECTION MOLDING A PLASTIC PART USING A FILM GATE

[76] Inventor: Siebolt Hettinga, 2123 NW. 111th St., Des Moines, Iowa 50325

[21] Appl. No.: 76,185

[22] Filed: Jun. 14, 1993

[51] Int. Cl.$^6$ .............................................. B29C 45/27
[52] U.S. Cl. .................... 264/328.1; 264/328.14; 264/334; 425/556; 425/DIG. 51
[58] Field of Search ............... 264/328.1, 334, 328.14; 425/553, 554, 556, 577, 468, 441, 438, DIG. 51, DIG. 5

[56] References Cited

U.S. PATENT DOCUMENTS

| | | | |
|---|---|---|---|
| 3,575,233 | 4/1971 | Mahle | 425/556 |
| 4,206,799 | 6/1980 | McDonald | 425/556 |
| 4,548,574 | 10/1985 | Badalamenti | 425/DIG. 51 |
| 4,576,568 | 3/1986 | Grannen, III | 425/DIG. 5 |
| 4,620,958 | 11/1986 | Wiechard | 425/DIG. 51 |
| 4,998,874 | 3/1991 | Stocchiero | 425/556 |

FOREIGN PATENT DOCUMENTS

| | | | |
|---|---|---|---|
| 159621 | 3/1983 | German Dem. Rep. | 425/DIG. 51 |
| 44-21230 | 9/1969 | Japan | 425/DIG. 51 |
| 759320 | 8/1980 | U.S.S.R. | 425/556 |

*Primary Examiner*—Jill L. Heitbrink
*Attorney, Agent, or Firm*—Brian J. Laurenzo; Kent A. Herink; Brett J. Trout

[57] ABSTRACT

A method and apparatus for injection molding a plastic part using a film gate. The film gate is constructed of a pair of tenon members which retract into a mortise tooled into a mold section. Because the tenon members extend to release the dross formed in the runner, the film gate may be placed in the center of the mold section to decrease the pressure gradient in the curing plastic and to allow the gate to be located where aesthetic aberrations, from the removal of the dross, will not be a problem in the finished article.

17 Claims, 3 Drawing Sheets

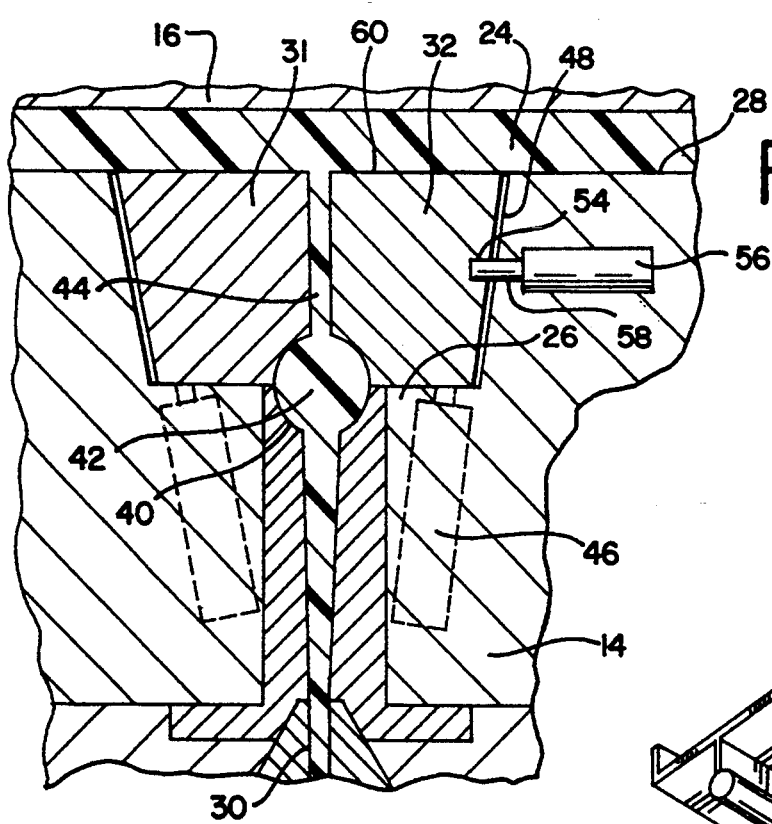
FIG. 1
FIG. 7
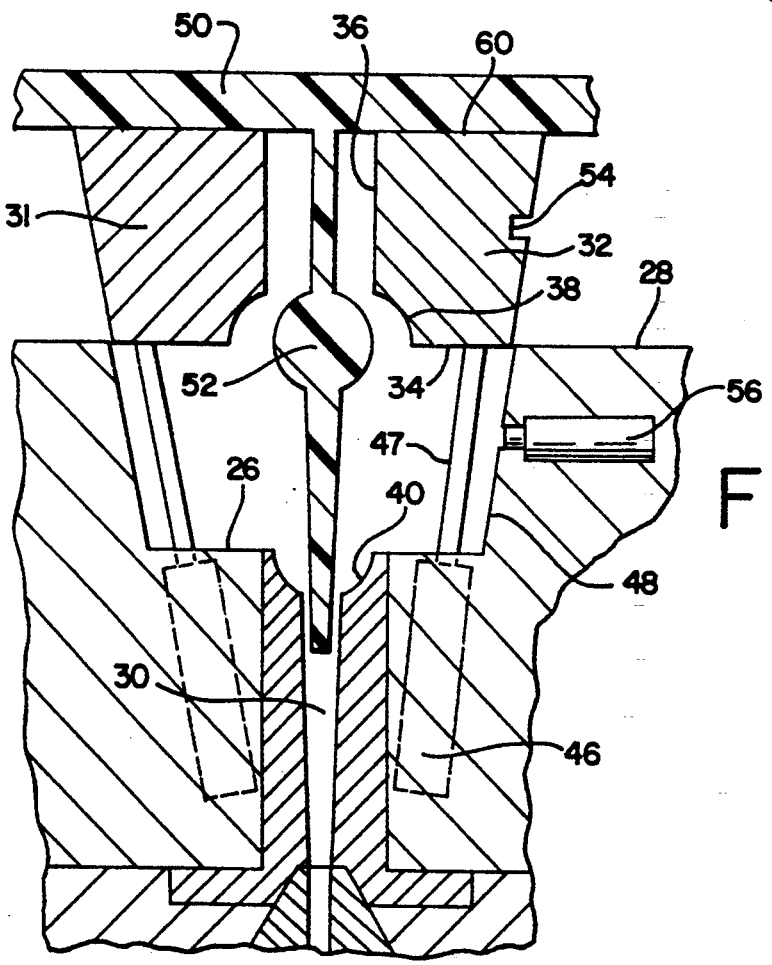
FIG. 2

METHOD FOR INJECTION MOLDING A PLASTIC PART USING A FILM GATE

BACKGROUND OF THE INVENTION

This invention relates to a gating apparatus and the method for injection molding a plastic part using a film gate. More specifically an apparatus and method where the film gate is mounted entirely on a single mold section and can be used to eject the finished molded part after the molding process is completed.

Plastic injection molding machines generally include a two-section mold unit. The mold unit is generally clamped together during the molding process to form a mold cavity. After the plastic has been injected into the cavity and cured the mold sections are pulled apart and the finished plastic article is removed. The plastic material enters the mold cavity through a sprue. The sprue is generally a cylindrical opening through one of the mold sections into the mold cavity. The sprue gate is the actual opening into the mold cavity. Often a tube or runner is oriented normal to the sprue to disperse a plastic material to several sprues or more evenly to a single sprue.

Fan gating involves the use of a thin slit-like opening to pass a plastic material into the mold cavity. Fan gating is well known in the art. In a typical fan gating apparatus, a runner is provided on the parting line of the mold unit approximately ten millimeters from the cavity. A portion of the mold unit is machined out between the runner and the cavity. When the mold sections are clamped together, a thin slit-like opening is formed between the runner and the mold cavity to create a sprue through which a plastic material is injected into the mold cavity. Fan gating allows a large amount of plastic injection material to be introduced into a mold cavity in a more even manner over a larger area.

Conventional fan gating apparatuses only allow a material to be injected from the side of a mold cavity. Material cannot generally been injected through a fan gate in the center of a mold section because the runner, which distributes the injection material to the film gate, would be completely enclosed by the mold section. The dross, or excess hardened plastic left in the runner after the fan gating procedure, would remain trapped within the mold section even after the mold unit was opened. Unlike the process which locates the runner between the two mold sections, the runner cannot be exposed to remove the dross if the runner is totally enclosed by a mold section.

Injecting material into a mold cavity through a fan gate located between the mold units requires the plastic injection material to flow a longer distance than if the material was injected from the top or bottom of cavity. Because the injection material must be forced all the way across the mold cavity to adequately fill both sides of the cavity, much greater pressure is needed to inject a material from the side of a cavity than through the center of one of the mold sections. By the time the plastic material has reached the far side of the mold cavity in a conventional side injection fan gating process, much of the injection pressure has been lost. This loss of pressure produces a differential throughout the plastic material. This molded-in stress is due to the different densities of the material caused by the pressure differential during the molding and curing processes.

In addition to this molded-in stress, conventional side oriented fan gates often require a complex runner system which often must be heated to adequately fill the mold cavity. Another problem with conventional fan gating systems is that it is often difficult to apply coverings or lamina to the plastic article during the molding process. When injecting a plastic material into a mold cavity from a fan gate located between mold sections, a portion of the perimeter about which the mold sections engage each other, which is often used to secure the lamina during the molding process, is completely utilized by the fan gate for the injection of the plastic material. The mold section engagement perimeter is therefore left unavailable to secure a lamina during the molding process.

Furthermore, using a fan gate on the edge of a mold unit often requires that the finished plastic part be trimmed along the entire surface of the finished plastic article facing the gate, this surface is often left aesthetically unappealing by such trimming. This is a particular problem if the surface is to be exposed to the consumer's view. Additionally, with conventional fan gating systems, a separate ejection system is generally required to remove the part from the mold unit after the molding process is completed.

The difficulties encountered in the prior art discussed hereinabove are substantially eliminated by the present invention.

SUMMARY OF THE INVENTION

Accordingly, it is an object of the present invention to provide a method for injection molding a plastic material using a film gate wherein the need for very large clamp pressure is eliminated.

A further object of the present invention is to provide a method for injection molding a plastic material using a film gate wherein the finished plastic article has little molded-in stress and is, therefore, unlikely to warp.

Another object of the present invention is to provide a method for injection molding a plastic article using a film gate where the seating perimeter of the mold sections is available to secure a molded-in covering or lamina to the non-gate side of the finished plastic article during the injection molding process.

Still another object of the present invention is to provide a method for injection molding a plastic article using a film gate wherein the attached runner and film gate may be located to place the dross on a non-aesthetically essential portion of the finished plastic article.

A further object of the present invention is to provide a method for injection molding a plastic material using a film gate wherein the distance a plastic material must be injected from the gate to the most distant area of the mold cavity is reduced.

Another object of the present invention is to provide a method for injection molding a plastic article using a film gate which eliminates the need for a heated runner during the injection molding process.

Yet another object of the present invention is to provide an injection molding film gating apparatus which eliminates the need for a separate apparatus to eject the finished plastic article after the molding process is completed.

These and other objects of the invention will become apparent upon reference to the following specification, drawings, and claims.

By the present invention, it is proposed to overcome the difficulties encountered heretofore. To this end, a first mold section is provided with a mortise running across the face of the mold section. A second mold section is also provided which when lowered into sealed engagement with the first mold section forms a mold cavity. A sprue through which plastic injection material can be injected into the mold cavity passes through the first mold section opening into the mortise. A pair of tenon members fit into the mortise of the first mold section thereby forming a runner and film gate through which a plastic material may pass from the sprue into the mold cavity when the mold sections are in sealed engagement. The pair of tenon members are retracted into a flush engagement with the first mold cavity face to form the runner and film gate. The first mold section is then clamped into engagement with the second mold section and a plastic injection material is forced through the sprue, through the runner, across the film gate, and into the mold cavity. After the mold cavity has filled, the plastic material is cured within the mold unit. The mold sections are unclamped, the tenon members extended, and the finished plastic article is withdrawn from the mold unit.

BRIEF DESCRIPTION OF THE DRAWINGS

In the drawings:

FIG. 1 is a side elevational view of the mold unit in cross-section showing the film gate closed with a plastic injection material passing through the sprue, runner, and film gate into the mold cavity, with a side lock holding a tenon member in securement to the mold section during the molding process.

FIG. 2 is a side elevational cross-sectional view of the mold unit in cross-section showing the gate open with the dross attached to the finished plastic article.

FIG. 7 is a perspective view of the finished plastic article showing the dross still attached to the plastic article.

DETAILED DESCRIPTION OF THE INVENTION

Figure 3:
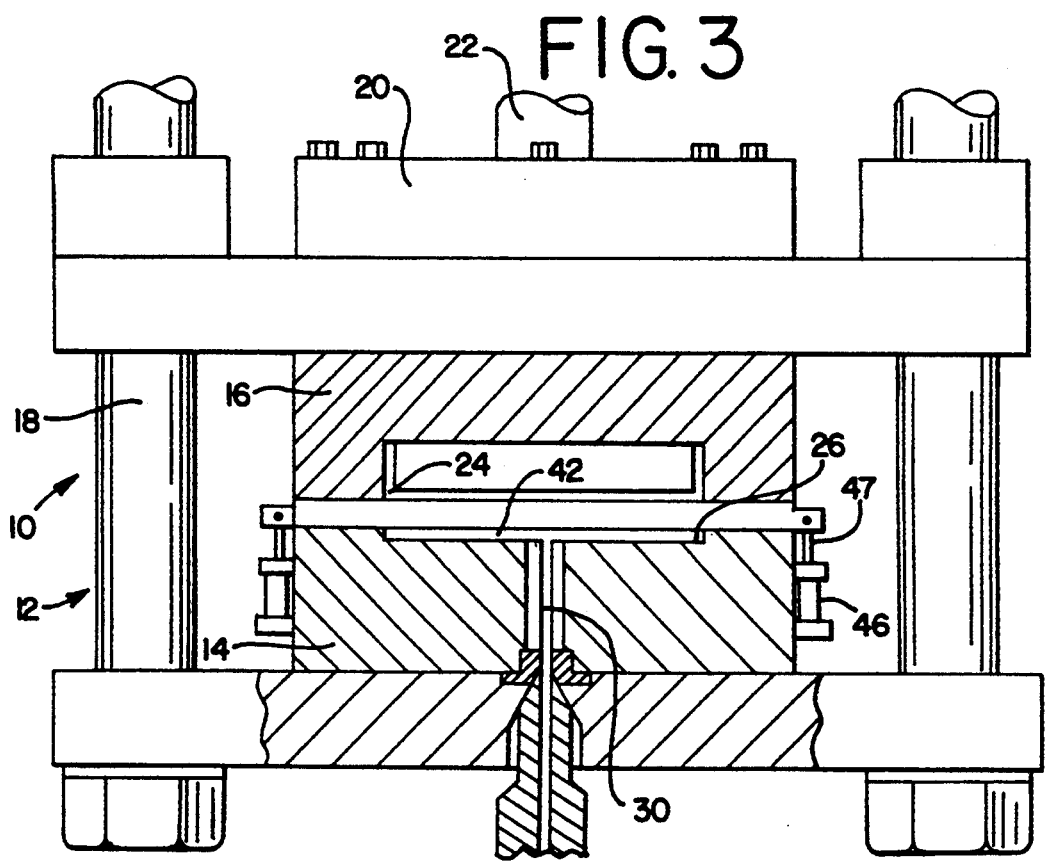
FIG. 3 is a front cutaway view of a mold unit showing the hydraulic pistons on either side of a stationary mold unit attached to a tenon member.
Figure 6:
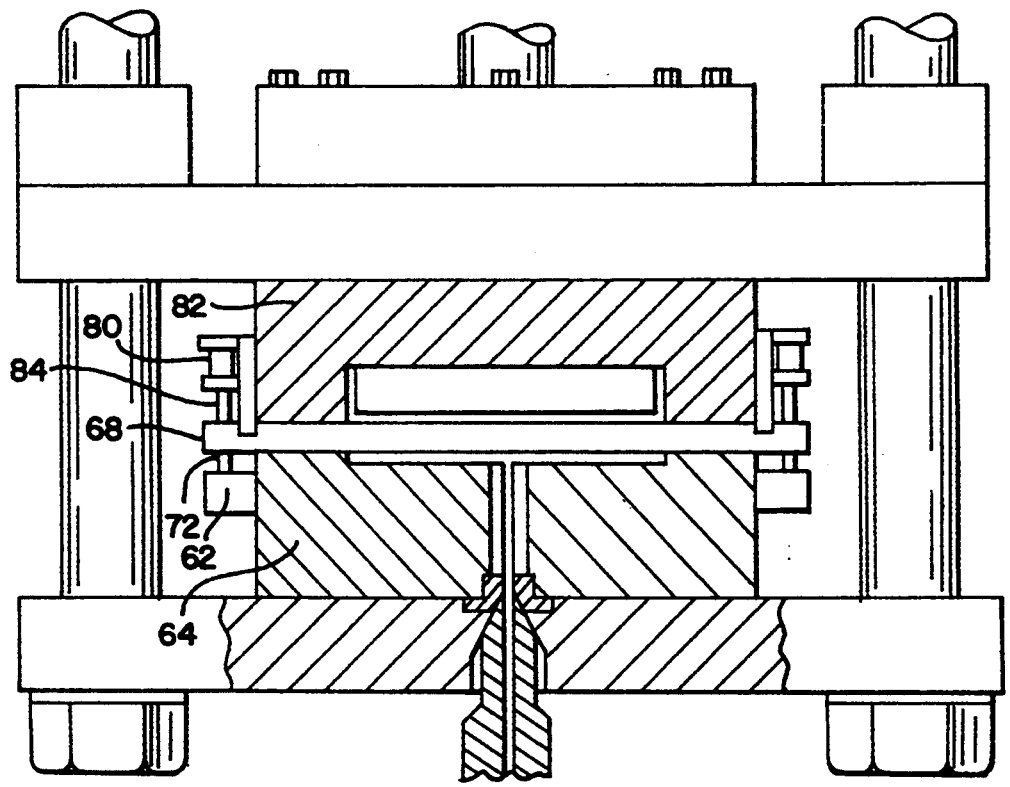
FIG. 6 is a front cutaway view of the alternate embodiment of the invention showing the hydraulic pistons mounted to either side of the movable mold section and the guide pins and guide pin assembly mounted to the stationary mold section.

A mold unit 10 is provided wherein one mold section 14 is grooved with a mortise 26 and has a sprue 30 located in a generally central location with respect to the mortise 26. Two tenon members are provided which can be moved into and out of dovetail engagement with the mortise 26. The tenon members 31 and 32 extend beyond the sides of the mold sections 14 and 16 so that they may be mounted to hydraulic pistons 46 which move the tenon members 31 and 32 into and out of engagement with the mortise 26. The sides of the tenon members 31 and 32 which face each other are tooled the length of the mold cavity 24 forming a film gate 44 through which an injection mold material may be passed from the sprue 30 through the film gate 44 into the mold cavity 24. The arris of each tenon member 31 and 32 which is formed by the sides of the tenon members 31 and 32 which face each other and the sides of the tenon members 31 and 32 adjacent the sprue 30 are concavely chamfered along the same length as the film gate 44.

The length of the mold section which adjoins these concave chamfers is tooled with an incurve so as to form a cylindrical hollow area within the mold section 14 when the tenon members 31 and 32 are pulled into engagement with the mortise 26. This hollow area acts as a runner 42 through which injected plastic material is disbursed along the length of the film gate 44 before being injected through the gate 44 and into the mold cavity 24.

Hydraulic pistons 46 are mounted to the sides of one mold section 14 and connected to the cantilevered portions of the tenon members 31 and 32 to retract, hold, and extend the tenon members 31 and 32 before, during, and after the molding process.

To begin the molding process, the hydraulic pistons 46 pull the tenon members 31 and 32 into engagement with the mortise 26 of the mold section 14 and lock rams 58 are engaged to hold the tenon members 31 and 32 in place during the molding process. The mold sections 14 and 16 are thereafter clamped together to form a mold cavity 24. A plastic material is injected through the sprue 30 into the runner 42, and pressure is maintained upon the plastic material until the runner 42 is filled and the plastic material begins to pass through the film gate 44 into the mold cavity 24. Pressure is maintained upon the plastic material until the mold cavity 24 is filled and the plastic material is cured.

After the plastic article 50 is cured, the mold sections 14 and 16 are unclamped and pulled apart. The hydraulic pistons 46 then extend the tenon members 31 and 32 which ejects the finished plastic article 50 from the mold cavity 24 so that the plastic article may be easily removed. After removal of the plastic article 50, the hydraulic pistons 46 pull the tenon members 31 and 32 back into a dovetail engagement with the mortise 26 of the mold section 14 so that the molding process may be repeated.

In the figures, a plastic mold unit 10 is provided consisting of a mold frame 12, a first mold section 14, and a second mold section 16 (FIG. 3). The first mold section 14 is affixed to the bottom of the mold frame 12 while the second mold section 16 moves into and out of sealed engagement with the first mold section 14 along the mold frame support rods 18. In the preferred embodiment, a platen 20 is attached to the second mold section 16 to evenly distribute weight over the second mold section 16. A hydraulic clamping piston (not shown) is used to force a ram 22 into the platen 20 thereby securing the second mold section 16 into sealed engagement with the first mold section 14. This engagement creates a mold cavity 24 between the two mold sections 14 and 16.

In the preferred embodiment, the first mold section 14 has a mortise 26 tooled across a generally centrally located transverse length of the face, or mold cavity, side of the mold section 14 (FIG. 2). A sprue 30 is located through the center of the first mold section 14 and opens into the mortise 26 of the first mold section 14. In the preferred embodiment, two tenon members 31 and 32 fit into dovetail engagement with the mortise 26 of the first mold section 14 and, in the preferred embodiment, are of a sufficient length to extend beyond both sides of the first mold section 14. Because the tenon members 31 and 32 are essentially mirror images of one another, description will only be made respecting a single tenon member 32.

The tenon member 32 is a bar of a length greater than the length of the mortise 26 tooled across the first mold section 14 and of a cross-section in the shape of the frustum of a right triangle (FIG. 1). When the tenon member 32 is in substantially flush engagement with the mortise 26 of the first mold section 14, the exposed face 60 of the tenon member 32 is substantially flush with the mold cavity face 28 of the first mold section.

The arris of the tenon member 32, formed by the side 34 of the tenon member 32 which faces the sprue 30 and the side 36 of the tenon member 32 which faces the adjacent tenon member 31, is concavely chamfered. This chamfer continues along the portion of the tenon member 32 which is parallel to the mold cavity 24. The chamfer thereby forms an incurve 38 along the tenon member 32. The concave chamfer cut into the tenon member 32 is symmetrical to the concave chamfer cut into the opposing tenon member 31 so that when the tenon members 31 and 32 are retracted into the mortise 26 the chamfers jointly form a hollow half-curve which runs the length of the mold cavity 24 which is parallel to the mortise 26. In the preferred embodiment, a symmetrical half curve 40 is tooled into the first mold section 14 directly above the hollow half curve formed by the tenon members 31 and 32 to form a hollow cylindrical runner 42 into which the sprue 30 opens (FIG. 1).

The side 36 of the tenon member 32 which faces the opposite tenon member 31 is tooled below the chamfer to form a recess along the length of the runner 42 (FIG. 2). When the tenon members 31 and 32 are seated into engagement with the mortise 26, these tooled recesses form a film gate 44 through which the plastic material may pass from the runner 42 into the mold cavity 24 (FIG. 1).

Hydraulic pistons 46 are mounted to the sides of the first mold section 14 (FIG. 3). The rams 47 of the hydraulic pistons 46 are secured to the cantilevered portion of the tenon member 32. The hydraulic pistons 46 are mounted obliquely to push the tenon member 32 along the sides 48 of the mortise 26 thereby moving the tenon member 32 downward and away from the opposite tenon member 31 (FIG. 2). The tenon members 31 and 32 thereby force the finished plastic article 50 out of the mold while creating an opening large enough so that the runner dross 52 may be removed from the mold section 14.

The cantilevered portions of the tenon member 32 is fitted with side slots 54 so that when the tenon member 32 is retracted by the hydraulic pistons 46, small hydraulic piston locks 56 mounted to the sides of the first mold section 14 can push their rams 58 into the slots 54 (FIG. 2). The tenon member 32 is thereby secured against movement during the injection molding process. Although only a single piston lock 56 is shown for the sake of clarity, in the preferred embodiment each side of each tenon member 32 is equipped with a piston lock 56.

In the molding process, the hydraulic pistons 46 retract the tenon member 32 along the sides 48 of the mortise 26 until the mold cavity side 60 of the tenon member 32 is flush with the face of the mold cavity 28 (FIG. 1). The small hydraulic piston locks 56 then insert their rams 58 into the slots 54 to secure the tenon member 32 in place. The second mold section 16 is slid into engagement with the first mold mold section 14 and clamped thereto (FIG. 3) by the hydraulic clamping piston (not shown). A plastic injection material is then forced through the sprue 30 into the runner 42 (FIG. 1). Because the runner 42 is of a larger area than the film gate 44, the runner 42 substantially fills with plastic injection material before the material begins to enter the film gate 44. Once the runner 42 is substantially filled with material, the plastic material begins to pass through the film gate 44 into the mold cavity 24.

Because the film gate 44 is centrally located across the mold cavity 24, the plastic material has a much shorter distance to travel to fill the same cavity as compared to a conventional side-mounted fan gate. Moving the material a shorter distance requires less pressure, so the pressure gradient between the material which enters the mold cavity 24 first, and the material which enters the mold cavity 24 last is substantially reduced. This reduced pressure gradient translates into less molded-in stress and therefore less warpage in the final plastic article.

After the plastic material has cured, the second mold section 16 is retracted from the first mold section 14 and the hydraulic piston locks 56 are released from the slots 54 in the tenon members 31 and 32. The hydraulic pistons 46 then extend the tenon members 31 and 32 along the sides 48 of the mortise 26 thereby simultaneously creating a space for the runner dross 52 to be removed and ejecting the finished plastic article 50 from the mold unit 10 (FIG. 2).

Figure 4:
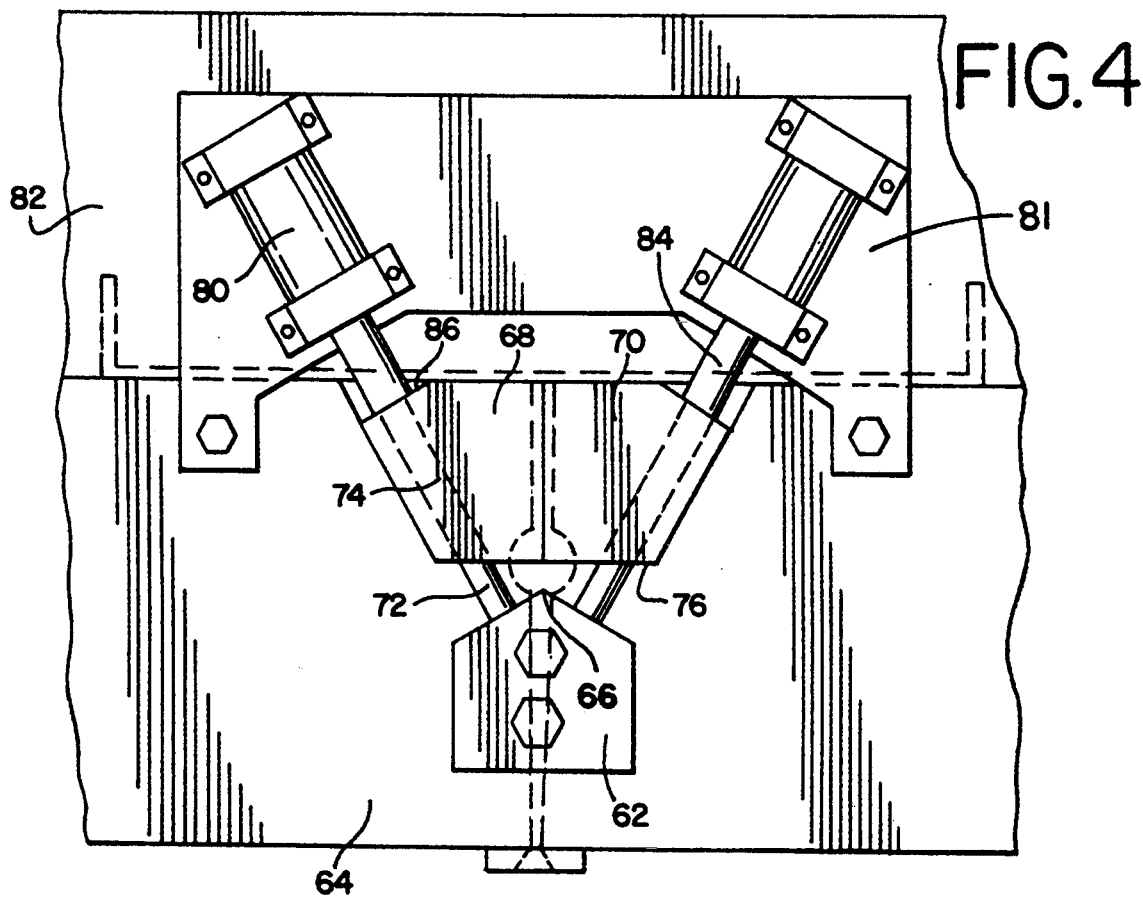
FIG. 4 is a side view of an alternate embodiment of the present invention where the tenon members are pushed rather than pulled into place and the tenon members move along guide pins which are supported by a guide pin assembly mounted to the side of a stationary mold section.
Figure 5:
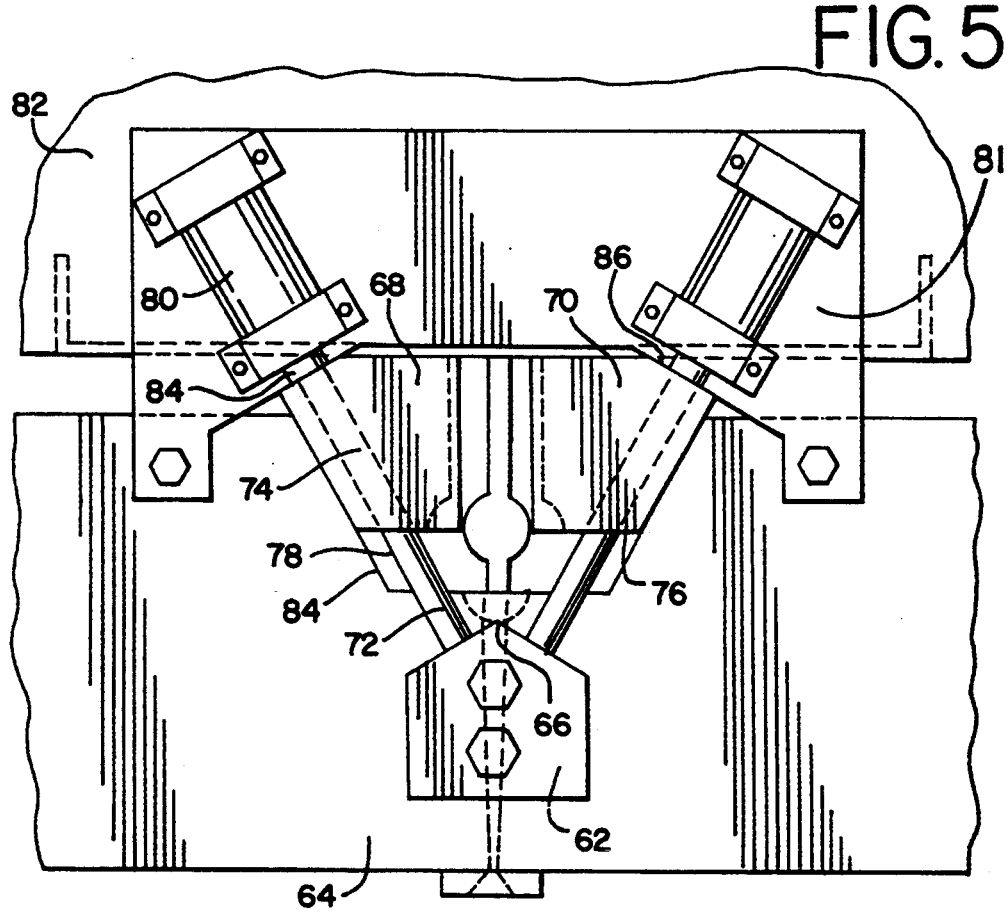
FIG. 5 is a side view of the alternate embodiment of the invention showing the film gate in the open position.

In an alternative embodiment of the present invention a guide pin support member 62 of a generally homeplate shape is secured to the sides of a first mold section 64 with the triangular corner 66 of the support member 62 pointing generally toward the cantilevered portions of the tenon members 68 and 70 (FIG. 4). Extending from the guide pin support member 62 are guide pins 72 which fit into bores 74 tooled into the sprue sides 76 of the cantilevered portions of the tenon members 68 and 70. The bores 74 guide the tenon members 68 and 70 as they are engaged and disengaged from a mortise 78 tooled into the first mold section 64 (FIG. 5). Hydraulic pistons 80 are mounted to a support bracket 81 secured to the second mold section 82. The hydraulic pistons 80 are connected by ram members 84. The hydraulic pistons 80 move the tenon members 68 and 70 along the sides 84 of the mortise 78 directed by the guide pins 72 running through the bores 74 of the tenon members 68 and 70. The method for molding a plastic part using this alternative embodiment of the apparatus is similar to the method described above for use with the preferred embodiment of the present invention.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that a single tenon member may be used with a runner having the shape of a half cylinder with the runner being formed by a concave chamfer cut ill the tenon member and a quarter-curve cut into the first mold section. It is further anticipated that tenon members which are shorter than the mold sections may be used with hydraulic pistons running through the mold section to produce a shorter film gate.

I claim:

1. A method for injection molding a plastic part comprising:
   (a) providing a first mold section with a mortise formed in said first mold section;
   (b) providing a second mold section which when lowered into sealed engagement with said first mold section forms a mold cavity;
   (c) providing a sprue running through said first mold section and opening into said mortise of said first mold section;
   (d) providing at least one tenon member which when inserted into said mortise of said first mold section forms a runner and a film gate through which a plastic material can pass from said sprue into said mold cavity;
   (e) retracting said tenon member into a generally flush engagement with said first mold section thereby forming said runner and said film gate;
   (f) clamping said first mold section and said second mold section together to form said mold cavity;
   (g) injecting said plastic material through said sprue;
   (h) forcing said plastic material through said runner and said film gate into said mold cavity;
   (i) curing said plastic material within said mold cavity;
   (j) unclamping said first mold section and said second mold section; and
   (k) extending said tenon member a sufficient distance to eject the finished plastic article from said first mold section with said tenon member.

2. The method according to claim 1, wherein said extension of said tenon member allows the removal from said first mold section of dross formed in said runner.

3. The method according to claim 1, wherein said tenon member is retracted by a hydraulic piston mounted to said first mold section and connected to said tenon member.

4. The method according to claim 1, wherein said tenon member is retracted by a plurality of hydraulic pistons mounted to said first mold section and connected to said tenon member.

5. The method according to claim 1 wherein said tenon member consists of a dovetailed metal bar tooled so that a corner of said bar is concavely chamfered to form said runner and a side of said bar is tooled to provide said film gate through which plastic material may pass from said sprue to said mold cavity.

6. The method according to claim 1, wherein said tenon member is retracted by a hydraulic piston mounted to a support bracket secured to said first mold section and connected to said tenon member.

7. The method according to claim 1, wherein said tenon member is retracted by a plurality of hydraulic pistons mounted to a support bracket secured to said first mold section and connected to said tenon member.

8. The method according to claim 7, further comprising providing guide pin support rods mounted to said first mold section along which said tenon member moves into and out of engagement with said mortise of said first mold section.

9. The method according to claim 8, further comprising providing a guide pin support mounted to said first mold section and securing said guide pins in proper alignment with said tenon member so that said tenon member may slide into and out of engagement with said mortise of said first mold section.

10. The method according to claim 9, wherein said guide pin supports are of a generally home-plate configuration.

11. The method according to claim 1, further comprising the step of heating the plastic material as the material passes through the runner.

12. The method according to claim 1, further comprising the step of heating the plastic material as the material passes through the sprue.

13. The method according to claim 1, further comprising the step of providing a plurality of tenon members which fit into substantially flush engagement with said mortise of said first mold section.

14. The method according to claim 1, further comprising the step of locking said tenon member with locking means to said first mold section during tile molding process.

15. The method according to claim 14, wherein said locking means comprise hydraulic pistons mounted on said first mold section and piston receiving slots located on said tenon member.

16. A method for injection molding a plastic part comprising:
   (a) providing a first mold section with a mortise formed in said first mold section;
   (b) providing a second mold section which when lowered into sealed engagement with said first mold section forms a mold cavity;
   (c) providing a sprue running through said first mold section and opening into said mortise of said first mold section;
   (d) providing at least one tenon member which when inserted into said mortise of said first mold section forms a runner and a film gate through which a plastic material can pass from said sprue into said mold cavity;
   (e) retracting said tenon member into a generally flush engagement with said first mold section thereby forming said runner and said film gate;
   (f) clamping said first mold section and said second mold section together to form said mold cavity;
   (g) injecting said plastic material through said sprue;
   (h) forcing said plastic material through said runner and said film gate into said mold cavity;
   (i) curing said plastic material within said mold cavity;
   (j) unclamping said first mold section and said second mold section; and
   (k) removing the finished plastic article and plastic hardened in said runner from said first mold section as a single integrally molded piece.

17. A method for injection molding a plastic part comprising:
   (a) providing a first mold section having an injection surface and a molding surface with a mortise formed in said first mold section and dividing said molding surface;
   (b) providing a second mold section which when lowered into sealed engagement with said first mold section forms a mold cavity;
   (c) providing a sprue running from said injection surface of said first mold section to said mortise formed in said first mold section;
   (d) providing at least two tenon members each having a surface which when said tenon members are inserted into said mortise form a runner and a film gate between the tenon member surfaces;

(e) retracting said tenon member into a generally flush engagement with said first mold section thereby forming said runner and said film gate dividing said molding surface of said first mold section;
(f) clamping said first mold section and said second mold section together to form said mold cavity;
(g) injecting said plastic material through said sprue;
(h) forcing said plastic material through said runner and said film gate into said mold cavity;
(i) curing said plastic material within said mold cavity;
(j) unclamping said first mold section and said second mold section;
(k) extending said tenon member a sufficient distance to release a portion of plastic material hardened within said runner and said film gate; and
(l) withdrawing the finished plastic article from said first mold section.

* * * * *